Patented Nov. 22, 1927.

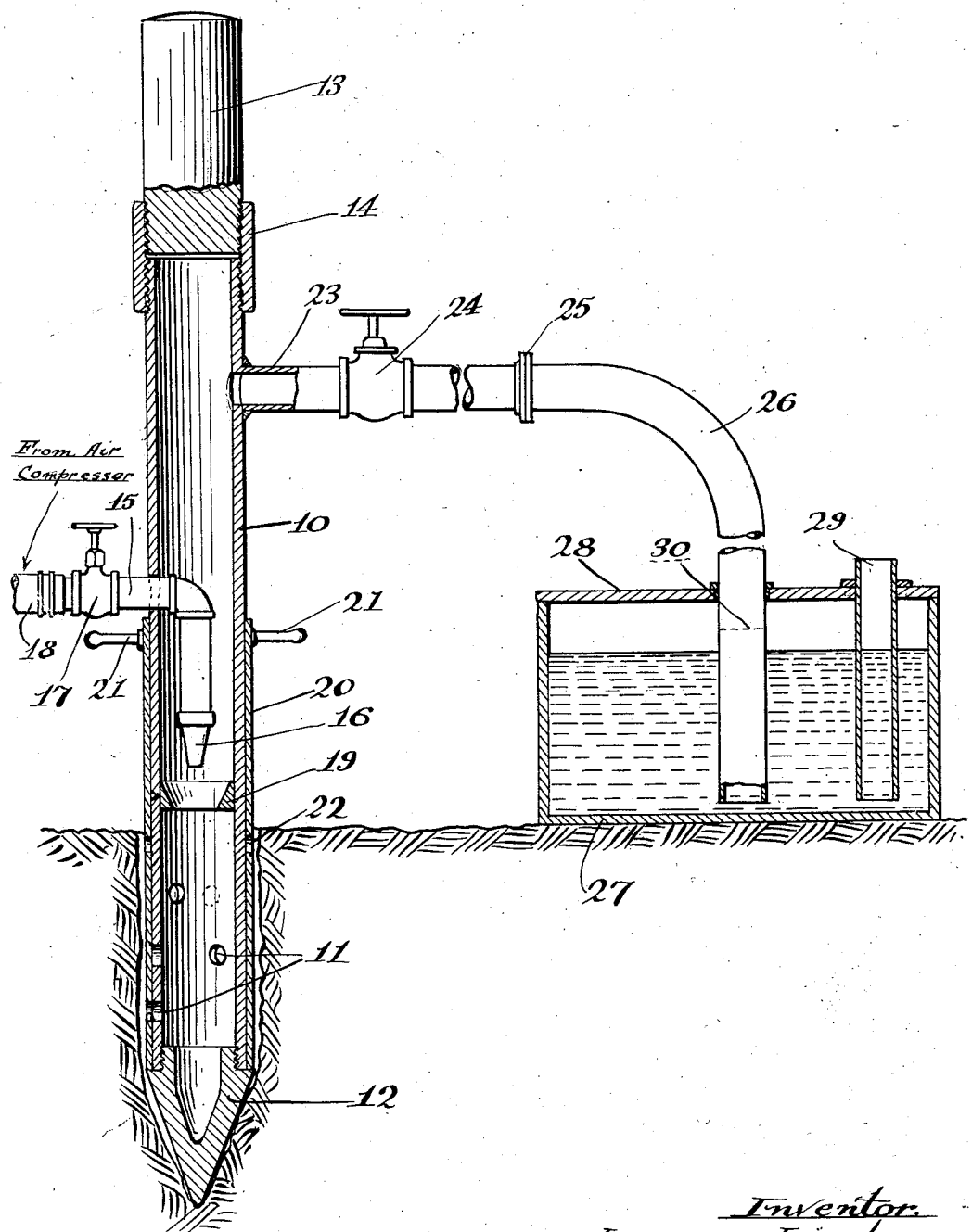

1,650,081

UNITED STATES PATENT OFFICE.

LYCURGUS LINDSAY, OF LOS ANGELES, CALIFORNIA.

DEVICE FOR AERATING AND FERTILIZING SOIL.

Application filed October 27, 1925. Serial No. 65,257.

This invention is for an apparatus for aerating and fertilizing soil.

An object of the invention is to provide a device which may be driven or otherwise inserted into the ground and which will discharge compressed air in a horizontal direction in the ground. In this manner the apparatus can be used for supplying free nitrogen to the ground below the surface and can be used for breaking up soil which has become hardened by irrigation.

A further object of the invention is to provide a device which will not only discharge air into the ground beneath the surface but which can also be used for injecting other materials, such as fertilizers and insecticides, into the ground.

With the foregoing and other objects in view which will be made manifest in the following detailed description and specifically pointed out in the appended claims, reference is had to the accompanying drawing for an illustrative embodiment of the invention, wherein:

The figure is a vertical section through the improved apparatus for aerating soil.

Referring to the accompanying drawing wherein similar reference characters designate similar parts throughout, the improved apparatus consists of a tube or conduit 10 which has its lower end perforated, as indicated at 11, and which has its bottom closed by a member 12 which is preferably pointed, to provide a piercing point facilitating the entrance of the conduit 10 upon being driven into the soil. The upper end of the conduit 10 is closed by means of a driving head 13 preferably formed of solid steel or equivalent material and to which a pneumatic hammer or other suitable driving device can be applied. The driving head 13 is fastened to the conduit 10 by means of a coupling collar 14. A pipe 15 extends into the conduit 10 and downwardly therein and has on its lower end a downwardly directed nozzle 16. The pipe 15 carries a valve 17 and is adapted to be connected to a flexible hose 18 adapted to convey compressed air or the like to the interior of the conduit 10 from a suitable source of supply, such as an air compressor. Within the conduit 10 below the nozzle 16 there is preferably arranged an annular member 19 providing a contracted throat or orifice through which the air discharged from the nozzle 16 may pass. About the lower end of the conduit 10 there is positioned a sleeve 20, which is rotatable by means of handles 21. This sleeve has apertures therein, indicated at 22, which are so arranged as to be successively brought into register with the perforations 11 upon rotation of the sleeve.

In this manner when the conduit 10 is inserted into the ground as indicated upon the drawing and the valve 17 is opened, the compressed air may be caused to discharge horizontally through the lowermost perforations 11 in the conduit 10 and through the sleeve 20. Upon rotation of the sleeve 20 the lowermost perforations 11 may be closed and those next above may be opened so that the air will be discharged horizontally upon a higher plane. Upon continued rotation of the sleeve these perforations may be closed and still higher perforations may be opened, thus causing the soil to be thoroughly aerated during the complete length of that portion of the conduit 10 which is imbedded.

In some instances it may be desirable to inject a fertilizer which may be either in powder form or liquid form. The improved apparatus is especially desirable in injecting a fertilizer which is somewhat volatile, as for example a fertilizer containing a compound of ammonia. By injecting the ammonia compound into the soil beneath the surface, it will be effectively prevented from gasifying and escaping into the atmosphere, which would do plant life no particular benefit. To this end a pipe 23 is connected to the conduit 10 preferably above the pipe 15. It is provided with a valve 24 and is adapted to be coupled by means of a coupling 25 to a flexible hose 26. The reference character 27 indicates a suitable container in which the fertilizer is adapted to be placed. It is illustrated as being provided with a removable cover 28 having a tube 29 extending therethrough downwardly into the container. When it is desired to discharge or inject a powdered material into the soil, the cover 28 together with the tube 29 is removed from the container 27 and the powdered material is placed therein. Preferably when the device is initially inserted into the ground, the valve 24 is closed and only the air is discharged, creating void spaces in the soil about the lower end of the conduit. After these void spaces have been suitably opened, the valve 24 is opened and the relatively easy discharge of air from the nozzle 16 through the orifice member 19 will produce a suction through the hose 26, causing the powdered material to be drawn up through it from the container 27 into the conduit 10, from which it is discharged through the perforations 11 and apertures 22 into the soil with the air. The end of the hose 26 may be passed over the surface of the powder facilitating the sucking up of the desired quantity.

In some cases where the land has become infested with insects, cut worms and the like, an insecticide, such as carbon bisulphide, may be employed. In this case the liquid insecticide is placed in the container 27 and the cover 28 with the tube 29 is applied thereto. The lower end of the hose 26 is preferably elevated into the position indicated by dotted lines at the reference character 30. Upon opening the valve 24, allowing the suction to take place within the hose 26 air is drawn downwardly through the tube 29 and bubbles through the liquid so that the gas from the liquid will be drawn through the hose 26. Obviously, if desired, a weak solution can be placed in the container 27 and this solution in liquid form can be drawn up through the hose 26 and gasified in the conduit 10 with the expanding compressed air and discharged therefrom through the apertures.

In some cases where the ground is extremely hard, it may be inadvisable to attempt to drive the device into the soil. In such cases a hole may be suitably drilled with an auger or pneumatic drill and the lower end of the conduit 10 inserted into it. Because of the fact that the apertures 22 and the perforations 11 discharge the air horizontally in the soil, there is no tendency of the air to push the apparatus up out of the hole, or the air to travel up along the sides of the conduit 10.

In general use of the apparatus where it is merely desired to aerate the ground, the valve 24 is first closed and air is admitted to, and discharged from, the conduit 10 under high pressure, breaking up the soil and creating the void spaces. After the soil has been sufficiently broken, the valve 24 is opened and allowed simply to admit air to the conduit 10, thus supplying a large quantity to the soil and thoroughly aerating it for a large area surrounding the conduit.

From the above description it will be readily appreciated that an improved device for aerating and fertilizing soil is provided which will not only cause air to be discharged horizontally at different levels beneath the soil, but which will also inject other suitable materials into the soil.

It will be understood that various changes in the detail of construction may be made without departing from the spirit or scope of the invention as defined by the appended claims.

I claim:

1. A device for aerating and fertilizing soil comprising a perforated conduit adapted to be driven into the ground, means providing a piercing point on the bottom of the conduit, means providing a driving head upon the upper end of the conduit, means for supplying compressed air to the conduit, and a sleeve rotatably mounted upon the outside of the conduit having apertures adapted to be caused to successively register with the perforations in said conduit.

2. A device for aerating and fertilizing soil comprising a perforated conduit, a sleeve rotatably mounted upon the outside of said conduit having apertures adapted to be successively brought into register with the perforations in the conduit upon rotation, means providing a piercing point upon the lower end of said conduit, means providing a driving head upon the upper end of said conduit, and a pipe extending into said conduit having a downwardly directed nozzle disposed therein, said pipe serving to supply compressed air to said conduit as and for the purpose described.

3. A device for aerating and fertilizing soil comprising a perforated conduit, a sleeve rotatably mounted upon said conduit having apertures adapted to be successively brought into register with the perforations in the conduit upon rotation, means providing a piercing point upon the lower end of said conduit, means providing a driving head upon the upper end of said conduit, a pipe extending into said conduit having a downwardly directed nozzle disposed therein, said pipe serving to supply compressed air to said conduit as and for the purpose described, and another pipe, valve controlled, communicating with said conduit for supplying other material thereto as and for the purpose described.

4. A device for aerating and fertilizing soil comprising a conduit having an opening therein adapted to be driven into the ground, a driving head closing the upper end of said opening, an air pipe communicating with the interior of said conduit for supplying compressed air thereto, said air pipe having a downwardly directed nozzle disposed within said conduit, and a valve controlled pipe communicating with the interior of said conduit for supplying other material thereto.

5. A device for aerating and fertilizing soil, comprising a perforated conduit adapted to be driven into the ground, means providing a removable piercing point on the bottom of the conduit, means providing a driving head on the upper end of the conduit, means for supplying compressed air to the conduit, and means whereby said compressed air may be discharged from said conduit selectively at different elevations beneath the surface of the ground.

6. A device for aerating and fertilizing soil, comprising a perforated conduit adapted to be driven into the ground, means providing a piercing point on the bottom of said conduit, means providing a driving head on the upper end of the conduit, means for supplying compressed air to the conduit and means for supplying other material to said conduit to be forced into the ground through the perforations therein, selectively at different elevations beneath the surface of the ground.

In testimony whereof I have signed my name to this specification.

LYCURGUS LINDSAY.